Dec. 29, 1959 — L. KADLEC ET AL — 2,919,344
HERMETICALLY SEALED ILLUMINATED INSTRUMENT
Filed May 31, 1957 — 2 Sheets-Sheet 1

INVENTOR.
LADISLAV KADLEC
ARTHUR BECKER
BY
*Leonard H. King*

Dec. 29, 1959   L. KADLEC ET AL   2,919,344
HERMETICALLY SEALED ILLUMINATED INSTRUMENT
Filed May 31, 1957   2 Sheets-Sheet 2
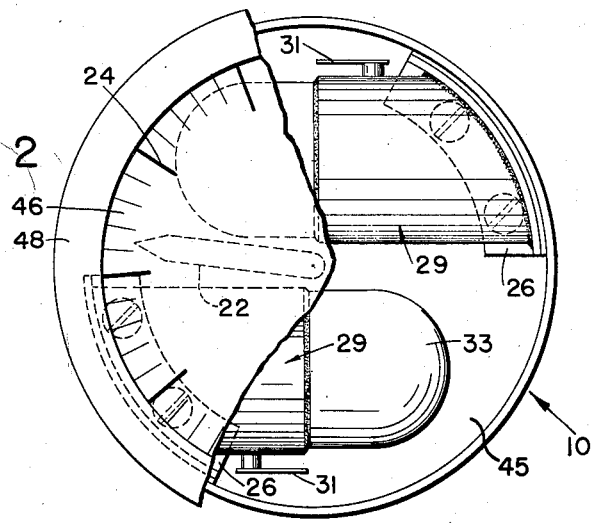
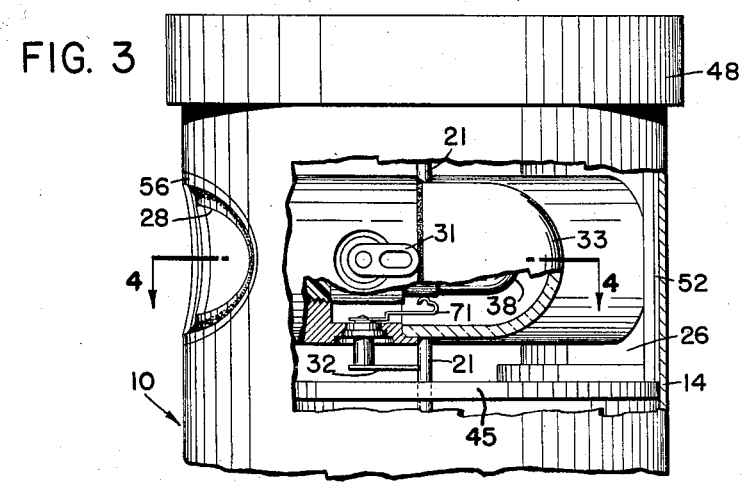
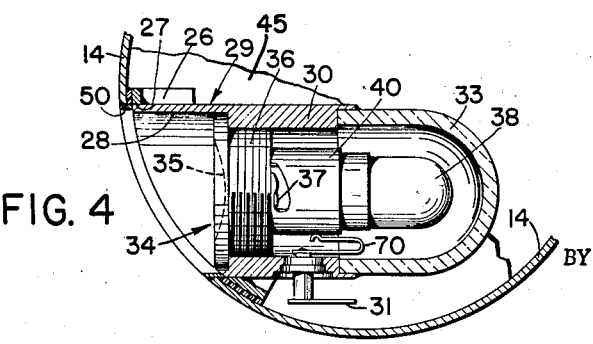
INVENTOR.
LADISLAV KADLEC
ARTHUR BECKER
BY Leonard H. King.

United States Patent Office 2,919,344
Patented Dec. 29, 1959

2,919,344

HERMETICALLY SEALED ILLUMINATED INSTRUMENT

Ladislav Kadlec, Jackson Heights, and Arthur Becker, Bayside, N.Y., assignors to Avien, Inc., Woodside, N.Y.

Application May 31, 1957, Serial No. 662,864

3 Claims. (Cl. 240—2.1)

This invention relates to measuring instruments provided with a dial face, dial indicia and a dial pointer, and more particularly to hermetically sealed instruments of this type, wherein a lighting element is disposed within the sealed portion of said instrument and used to illuminate the dial face thereof.

For specialized applications such as installation in high-altitude aircraft, or where extremes of moisture or pressure exist, it is frequently necessary to hermetically seal such instruments by providing a gas-tight casing enclosing the instrument, evacuating substantially all air from within the instrument and then introducing an inert gas such as nitrogen or helium, thus effectively shielding the instrument components against any contamination or moisture damage. A further requirement frequently encountered is that there be lighting means illuminating the dial face of the instrument from a position to the rear of the dial face as seen by the viewer, such as where the instrument is mounted on a panel in an aircraft.

Hermetically sealed illuminated instruments of this type generally comprise an instrument section and an external casing section. The instrument section comprises the mechanical and electrical components appropriate for the measuring function desired, and includes a dial face and lighting means proximate to this dial face. These components are mounted on a suitable plate or base. The casing section comprises an external shell, generally cylindrical in shape, with a dial window at one end registering with the dial face of the instrument, the other end of the casing being open and abutting on the mounting plate of the instrument section. Air-tight sealing is effected by means of a tear strip binding the external shell to the instrument base plate. The air retained within the casing can then be evacuated by well-known means.

A very desirable feature for such sealed instruments is the provision that the lighting means be rapidly removed and replaced when necessary, without having to tamper with the sealed condition of the instrument. Thus the time-consuming, complex and expensive steps of resealing the instrument, again evacuating the air from it, and again introducing the inert gas such as nitrogen or helium, would all be avoided. To accomplish this, the light bulb should be externally accessible, as by an opening in the external shell giving access to the light bulb, without disturbing the hermetic seal encasing the other components.

However, the bulb mounting must, in any practical instrument, be carried by the instrument section, otherwise any attempt to slide the external shell section free of the instrument section would cause the bulb mounting joined to such external shell to collide with the internal portion of the dial face, making removal impossible. It is therefore proposed that the lighting means be disposed within a re-entrant cavity, externally accessible through an opening in the external shell, with the housing defining this re-entrant cavity being carried by the internal components of the instrument.

This in turn requires a second hermetic sealing means, to insure that the area between the internally carried housing and the external shell opening be effectively sealed against entry of air and that the inert gas within the casing be sealed from escaping. It might be suggested that an annular ring of solder be deposited in the area between the opening in the external shell and the housing carried by the instrument section. But this has the serious drawback of being a permanent seal, or at least very difficult to remove. In the event that it is desired to dismantle the unit for inspection and repair, there would then be the necessity for melting the solder seal, with the attendant risk of having solder run into the interior portion of the instrument, damaging expensive and fragile precision components; furthermore the heat necessary for removing the solder may be injurious to the instrument.

It is therefore a specific object of the present invention to provide improved sealing means for a hermetically sealed illuminated instrument.

It is a further object of the present invention to provide for improved lighting means for an instrument of this type, wherein said lighting means may be rapidly removed and replaced with no rupturing of the hermetic seal encasing other components.

Yet another object of the present invention is to provide for rapid dismantling and disassembling means for a hermetically sealed dial-type instrument having rear lighting for said dial.

These and other objects and advantages of the present invention will appear more fully hereafter from a consideration of the detailed description which follows together with the accompanying drawings wherein the invention is illustrated.

In the drawings:

Figure 2 is a portion of a plan view of a device of this invention, shown partly cut away.

Figure 3 shows a portion of the device in a partly cut away elevation view.

Figure 4 is a cross section taken through line 4—4 of Figure 3, of a device of this invention.

Figure 1:
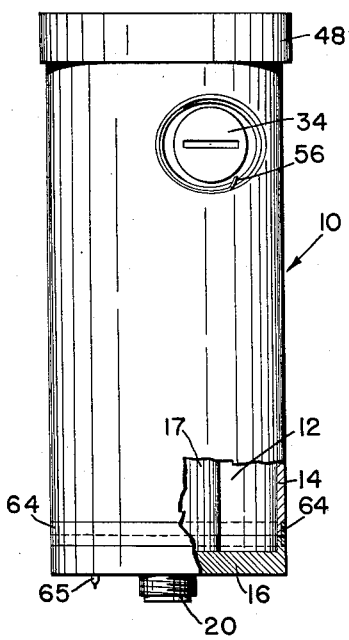
Figure 1 is a side elevation, partly cut away, of a device of this invention.

As shown in Figure 1, the device, characterized generally by the numeral 10, comprises an instrument section 12, and a casing section 14. The instrument section is mounted on base plate 16, and is composed of the electrical and mechanical components (typified by motor 17) appropriate to the measuring function desired, with data fed in by conductors connected to hermetically sealed terminal 20 which passes through base plate 16. Motor 17 through a gear train (not shown) and shaft 21 control the movement of dial pointer 22 which sweeps over dial face 24 to register with graduated scale or indicia 25 appropriate to the instrument involved.

Dial face 24 is supported in spaced relationship, with respect to base plate 16, by means of arcuate support members 26 having arcuate wall portions concentric with the shell 14. Members 26 are affixed to plate 45 which, in turn, is attached to base plate 16 by conventional brackets (not shown).

As seen in Figure 4, support member 26 has an opening 27 therein, proximate to the dial face. Opening 27 serves as the orifice for re-entrant cavity 28, said cavity being defined by housing 29, which is oriented to point inwardly of support member 26. Housing 29 comprises an internally threaded base portion 30, terminals 31 and 32 associated therewith, and clear glass shell 33. The shell 33 is sealed to base 30.

Figure 5:
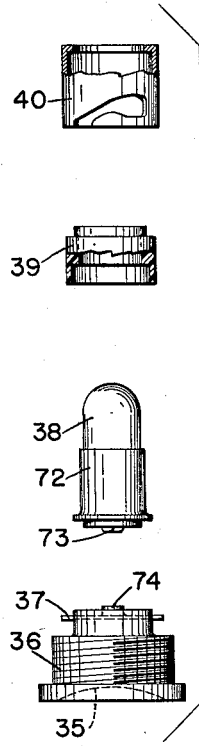
Figure 5 is an exploded view, shown partly cut away, of a lamp retaining device.

Light bulb holder 34 (shown in detail in Figure 5) comprises a slotted base portion 35, and externally threaded portion 36 adapted to register with threaded base portion 30 of housing 29, and bayonet mount 37. Light bulb 38 is affixed to said socket base by insulating plastic sleeve 39 and metal collar 40. Collar 40 is grasped by the bayonet mount 37. It will be apparent that bulb holder 34 with its associated bulb can be removed as a unit by unscrewing the slotted base portion 35 of the holder.

External shell 14 comprises a cylindrical body portion, preferably formed of metal, open at one end and having a dial window 46 at the opposite end, securely affixed to said body portion by bezel 48. Instrument section 12 is adapted to be encased by external shell 14 by passing dial face 24 into the open end portion of the external shell, and moving it inward until it registers with dial window 46, the rim of the open end portion of shell 14 then abutting with the edge of base plate 16.

Figure 6:
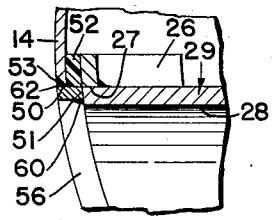
Figure 6 is an enlarged view showing a detail of the sealing means employed in a device of this invention.

As shown in Figure 4, an opening 50 is positioned on shell 14 to register concentrically with opening 28 formed in housing 29. Opening 50, however, has an appreciably larger diameter than opening 28, leaving an annular rim portion 51 of housing 29 exposed when the openings register. As shown in Figure 6, the upper annular edge of opening 50 is provided with a beveled or chamfered edge. With external shell 14 in place, it will be seen that opening 28 is still externally accessible, for the removal and replacement of light bulb holder 34.

However, it will be noticed that the area between support member 26 and external shell 14 is not sealed at the juncture of the opening 50 and support member 26. In the present invention, this is provided for by disposing centrally-pierced gasket 52 between opening 50 and support member 26, concentrically therebetween. Gasket 52 is preferably formed of Teflon or similar heat-resistant plastic, and has a central aperture 54 substantially equal in diameter to opening 50.

Figure 8:
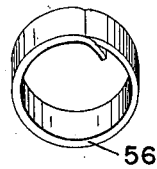
Figure 8 is a perspective of a tear band employed in the device of this invention.
Figure 7:
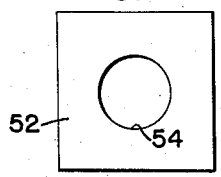
Figure 7 is a plan view of a plastic sealing gasket employed in the device of this invention.

As best seen in Figure 6, an annular tear strip 56 (shown in Figure 8) is disposed on annular rim portion 51, closely abutting opening 50 and aperture 54. To seal this tear strip in this position, solder 60 is deposited against the inner base of said tear strip upon rim 51 and along the outer top portion 53, in the channel defined by the upper outer portion of the tear strip, and beveled edge of the opening 50. An effective seal, rupturable when desired, is thus effectuated, adequate to seal the interstice between the external shell and the support member at this juncture.

Second tear strip 64 is disposed circumferentially at the juncture of the open edge of external shell 14 and base plate 16, to form a hermetic seal. Air enclosed within the casing defined by shell 14 and base plate 16 is then substantially evacuated by means of duct 65, and an inert gas such as nitrogen or helium introduced. The duct is then sealed off.

Suitable leads (not shown) interconnect connector 20 with terminals 31 and 32. Terminals 31 and 32 are of the hermetic seal type and make contact with the spring members 70 and 71 which in turn make electrical contact with member 40 and the base 72 of lamp 38. Lamp terminal 73 is contacted by spring member 74 which is in turn connected to member 40 through bayonet mount 37.

In operation, light bulb 38 is disposed to the rear of dial face 24, and illuminates said dial face through clear glass shell 33. When the bulb fails, it is readily removable, as previously explained. There has thus been effectuated a hermetically sealed illuminated instrument wherein the lighting means may be readily removed without tampering with the sealed condition of the other components of the instrument. While there is shown a glass shell 33, it is to be understood that a transparent plastic shell may be likewise employed in carrying out the invention.

While in accordance with the statutes there is disclosed herein the best mode for carrying out the invention presently contemplated, it is to be understood that various changes may be made without departing from the spirit of the invention.

We claim:

1. An illumination arrangement for an indicating instrument enclosed within a hermetically sealed container, said container comprising a tubular portion closed at one end by a transparent window and the other end closed by a base plate, said tubular portion having an edge portion defining an aperture for the insertion and removal of an illuminating lamp; a lamp housing having an aperture for the insertion and removal of an illuminating lamp at one end and a transparent casing hermetically sealed to the other end; means supporting said lamp housing, with the aperture therein in juxtaposition with the aperture in the said tubular portion; a removable tear band positioned against said edge portion of said tubular member; solder means sealing said tear band to said edge portion; and solder means sealing said tear band to said lamp insertion end of said lamp housing to provide a continuous wall between the interior of said container and the exterior of said container.

2. The apparatus of claim 1 wherein said edge portion is beveled.

3. An illumination arrangement for an indicating instrument enclosed within a hermetically sealed container, said container comprising a tubular portion closed at one end by a transparent window and the other end closed by a base plate, said tubular portion having an edge portion defining an aperture for the insertion and removal of an illuminating lamp; a lamp housing having an aperture for the insertion and removal of an illuminating lamp at one end and a transparent casing hermetically sealed to the other end; means supporting said lamp housing, with the aperture therein in juxtaposition with the aperture in the said tubular portion; a removable tear band positioned against said edge portion of said tubular member; solder means sealing said tear band to said edge portion; solder means sealing said tear band to the said lamp insertion end of said lamp housing to provide a continuous wall between the interior of said container and the exterior of said container; and a plastic gasket interposed between said lamp housing and said container.

References Cited in the file of this patent

UNITED STATES PATENTS

| 1,743,401 | Schlaich | Jan. 14, 1930 |
| 2,203,514 | Bacon | June 4, 1940 |
| 2,264,640 | Powers | Dec. 2, 1941 |
| 2,806,132 | Swanson et al. | Sept. 10, 1957 |
| 2,810,821 | Cohn | Oct. 22, 1957 |
| 2,837,052 | Viret | June 3, 1958 |
| 2,837,053 | Viret | June 3, 1958 |